US007377878B2

(12) United States Patent
Reuschel

(10) Patent No.: US 7,377,878 B2
(45) Date of Patent: May 27, 2008

(54) METHOD AND APPARATUS FOR DETERMINING A SLIP VALUE DESCRIBING THE TORQUE TRANSMISSION RELIABILITY OF A BELT-DRIVEN CONICAL-PULLEY TRANSMISSION

(75) Inventor: Michael Reuschel, Ottersweier (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/810,389

(22) Filed: Jun. 5, 2007

(65) Prior Publication Data

US 2008/0004157 A1 Jan. 3, 2008

Related U.S. Application Data

(63) Continuation of application No. PCT/DE2005/002110, filed on Nov. 24, 2005.

(30) Foreign Application Priority Data

Dec. 18, 2004  (DE)  ...................... 10 2004 060 994

(51) Int. Cl.
*F16H 61/662* (2006.01)
*F16H 61/00* (2006.01)
*F16H 61/664* (2006.01)

(52) U.S. Cl. .......................................... 477/45; 477/50
(58) Field of Classification Search ............ 477/44–46, 477/50; 701/51, 58
See application file for complete search history.

(56) References Cited

U.S. PATENT DOCUMENTS 6,086,506 A * 7/2000 Petersmann et al. .......... 477/45

6,477,446 B1 * 11/2002 Holtmann et al. .......... 700/281
6,939,264 B2 * 9/2005 Hommes et al. ............. 477/45
7,174,246 B2 * 2/2007 Bitzer ......................... 701/51
2006/0058128 A1 * 3/2006 Glas ............................ 474/8

FOREIGN PATENT DOCUMENTS

| DE | 195 44 061 A1 | 6/1996 |
|---|---|---|
| DE | 100 50 218 A1 | 4/2002 |
| DE | 103 10 831 A1 | 11/2003 |
| WO | WO 02/101264 A | 12/2002 |
| WO | WO 03/027540 A1 | 4/2003 |

OTHER PUBLICATIONS

Translation for DE 10310831 (cited as X reference in search report).*

* cited by examiner

*Primary Examiner*—Tisha D Lewis
(74) *Attorney, Agent, or Firm*—Alfred J. Mangels

(57) ABSTRACT

A method for determining a slip value describing the reliability of torque transmission between two conical disk pairs of a continuously variable transmission. The conical disk pairs are frictionally engaged by an endless torque-transmitting component. The contact pressure between at least one conical disk pair and the endless torque-transmitting component is modulated, and the slip value is determined from the difference in rotational speeds of the conical disk pairs upon modulation of the contact pressure. The pressure modulation is carried out at a modulation frequency that is above the transmission ratio adjustment frequency of the transmission and at a predetermined amplitude.

9 Claims, 3 Drawing Sheets

METHOD AND APPARATUS FOR DETERMINING A SLIP VALUE DESCRIBING THE TORQUE TRANSMISSION RELIABILITY OF A BELT-DRIVEN CONICAL-PULLEY TRANSMISSION

CROSS-REFERENCE TO RELATED APPLICATION

This is a continuation of International Application Serial No. PCT/DE2005/002110, with an international filing date of Nov. 24, 2005, and designating the United States, the entire contents of which is hereby incorporated by reference to the same extent as if fully rewritten.

BACKGROUND OF THE INVENTION

1. Field of the Invention

The present invention relates to a method and an apparatus for determining a slip value that describes the torque transmission reliability between two conical disk pairs of a belt-driven conical-pulley transmission that are frictionally engaged by an endless torque-transmitting means.

2. Description of the Related Art

For reasons of convenience, fuel consumption, and the environment, automated power trains are being used increasingly in motor vehicles. Such power trains contain, for example, a belt-driven conical-pulley transmission having a continuously variable transmission ratio. For continuously reliable operation of such a transmission, suitable contact pressure between the endless torque-transmitting means and the conical disks is important. Suitable signifies first that the contact pressure ensures that the endless torque-transmitting means does not slip, and second that the contact pressure is not unnecessarily high, so that it does not produce any unacceptable loads on parts and detract from the efficiency as a result of the high hydraulic pressure that must be provided. To control or regulate the contact pressure efficiently, precise knowledge of the reliability of torque transmission, or of the slippage condition, between the conical disks of the belt-driven conical-pulley transmission and the endless torque-transmitting means is necessary. Direct measurement of that slippage is complicated and expensive, since in addition to the rotational speeds of the pairs of conical disks and the speed of the endless torque-transmitting means, it is also necessary to know the exact effective radii at which the frictional engagement between the endless torque-transmitting means and the conical surfaces of the pairs of conical disks occurs.

If a slip value corresponding to the torque transmission capability of the belt-driven transmission or the latter's slippage condition is determined by modulating the contact pressure of the conical disks and determining the slip value for example by a lock-in principle or a fast Fourier transformation (FFT transformation), possibly using band pass filtering, that generally does not lead to well defined results.

An object of the present invention is to provide a method and/or an apparatus of the type described at the beginning, with which a slip value can be determined that gives the most meaningful information possible about the torque transmission reliability of the belt-driven transmission.

SUMMARY OF THE INVENTION

The part of the object relating to the method is achieved with a method for determining a slip value that describes the reliability of torque transmission between two conical disk pairs of a belt-driven conical-pulley that are frictionally engaged through an endless torque-transmitting means. A contact pressure force between at least one conical disk pair and the endless torque-transmitting means is modulated, and the slip value is determined from the reaction of the difference in rotational speed of the conical disk pairs to the modulation of the contact pressure force. The pressure is modulated at a frequency that is higher than the transmission ratio adjusting frequency of the transmission and by a predetermined amplitude.

It has been found that the slip value determined from the reaction of the difference in rotational speed of the conical disk pairs to the modulation of the contact pressure, along with the level of pressing reliability, which indicates, for example, the factor by which the actual pressure exceeds the pressure at the slippage boundary, also depends on the frequency and amplitude of modulation of the contact pressure force. In accordance with the invention, the pressure is therefore modulated at a frequency that is higher than the transmission ratio adjustment frequency of the transmission, that is, a frequency at which the transmission does not react to a change of contact pressure with an opposite change of the distance between the conical disks of each conical disk pair. The result is that changes to the difference in rotational speeds of the conical disk pairs that accompany a modulation of the contact pressure are attributable only to a change in the slippage resulting from a change in the contact pressure. The contact pressure is modulated at a predetermined amplitude, so that influences of changes in the modulation amplitude on the measured slip value can be ruled out.

In another method that solves this part of the problem of the present invention to determine a slip value that describes the reliability of torque transmission between two conical disk pairs of a belt-driven conical-pulley transmission that are frictionally engaged through an endless torque-transmitting means, a contact pressure between at least one conical disk pair and the endless torque-transmitting means is modulated and the slip value is determined from the reaction of the difference in rotational speeds of the conical disk pairs to the modulation of the contact pressure, where the pressure is modulated at a frequency that is higher than the transmission ratio adjustment frequency of the transmission, the amplitude of the pressure modulation is detected, and the slip value is determined as a function of the amplitude. The influence of the amplitude of the pressure modulation on the determined slip value can be taken into account in the analysis. The latter method is advantageous when it is not possible to maintain a predetermined amplitude.

In a further method to achieve the object of the present invention for determining a slip value that describes the reliability of torque transmission between two conical disk pairs of a belt-driven conical-pulley transmission that are frictionally engaged with an endless torque-transmitting means, a contact pressure between at least one conical disk pair and the endless torque-transmitting means is modulated and the slip value is determined from the reaction of the difference in rotational speeds of the conical disk pairs to the modulation of the contact pressure, where the pressure is modulated at a frequency that is higher than the transmission ratio adjustment frequency of the transmission, the frequency of the pressure modulation is registered, and the slip value is determined as a function of the frequency. In that way the influence of the frequency on the determined slip value can be taken into account in the analysis.

Advantageously, a standardized slip value is determined from the determined slip value(s) on the basis of at least one characteristic curve that includes a dependency of the slip value on a parameter of the pressure modulation (for example, frequency or amplitude). The standardized slip value represents a reproducible and objective measure of the momentary torque transmitting capability of the belt-driven transmission, and can be used to control the pressure force between the conical disks and the endless torque-transmitting means. That is advantageous in that the standardized slip value is thereafter a function essentially only of the level of pressing reliability, which is of central importance for the operation of the transmission.

It is advantageous to modulate only the pressing force acting on the driven conical disk pair.

It is also advantageous if, when there are a plurality of pressure chambers acting on a conical disk pair, the pressing force acting in the chamber designed with the largest effective cross section is modulated.

The slip value can be determined for example with the help of the lock-in principle.

It is also advantageous if the slip value is determined using at least one band pass filtering.

Apparatus for determining a slip value that describes the torque transmission reliability between two conical disk pairs of a belt-driven conical-pulley transmission that are frictionally engaged by an endless torque-transmitting means, whereby this part of the object of the invention is achieved, includes a device for producing a modulation of the contact pressure force exerted on the endless torque-transmitting means by at least one conical disk pair, a device for determining the rotational speeds of the conical disk pairs, a device for detecting at least one parameter of the modulation of contact pressure force, and an analysis and determining device for ascertaining the difference in rotational speeds of the conical disk pairs and for determining the slip value.

BRIEF DESCRIPTION OF THE DRAWINGS

The invention will be described below on the basis of drawings in exemplary form and with additional details.

The drawing figures show the following.

DESCRIPTION OF THE PREFERRED EMBODIMENTS

Figure 1:
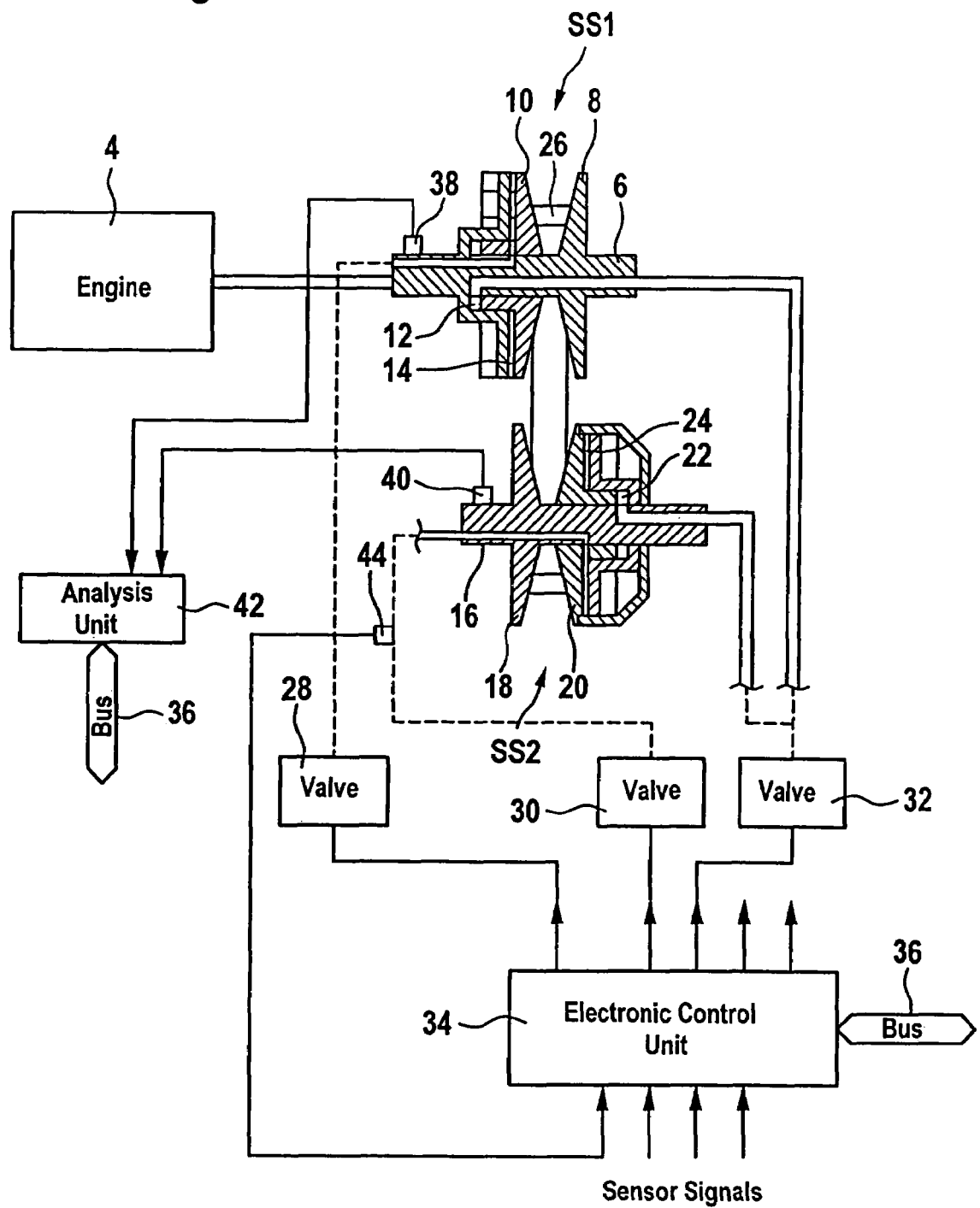
FIG. 1: a schematic diagram of a part of a power train of a motor vehicle having a belt-driven conical-pulley transmission and an associated control.

In accordance with FIG. 1, an input shaft 6 of a belt-driven conical-pulley transmission is driven by an internal combustion engine 4 by interposing a preferably automatic clutch (not shown) and a direction-reversing gearbox. Input shaft 6 is rigidly connected to a conical disk 8 of an input-side pulley SS1. Another conical disk 10 is situated on input shaft 6 so that it is rotationally fixed thereto and is axially movable. Situated between axially movable conical disk 10 and a supporting part that is rigidly connected to input shaft 6 are pressure chambers 12 and 14 by which, when they are pressurized, it is possible to change the force with which axially movable conical disk 10 can be pressed in the direction of conical disk 8.

In a similar manner, a pulley SS2 on the output side has a conical disk 18 that is rigidly connected to a power take-off or output shaft 16, and an axially movable conical disk 20 that can be forced in the direction of conical disk 18 by pressurizing corresponding pressure chambers 22, 24. Between the two pulleys SS1 and SS2 circulates an endless torque-transmitting means 26, for example a link chain.

The contact pressure force with which endless torque-transmitting means 26 is in contact with and frictionally engaged with the conical surfaces of the conical disk pairs is controlled by means of hydraulic valves 28, 30, and 32, which determine the pressures in the respective pressure chambers.

The controlling of valves 28, 30, and 32 is accomplished by an electronic control unit 34, at the input of which there are signals from sensors (not shown) that contain essential information for controlling the valves, which are converted to control signals for the valves corresponding to the algorithms stored in control unit 34. Other outputs of control unit 34 can trigger an automatic clutch, for example. In the illustrated example, hydraulic valve 32 can be controlled independently by a mechanical torque sensor (not shown) without being connected to control unit 34, and determines a basic contact pressure force. Hydraulic valves 28 and 30 for adjusting the transmission ratio are not both mandatory. Advantageously, control unit 34 communicates via a bus connector 36 with other control units or electronic devices of the vehicle.

The construction and function of the arrangement described above are known, and therefore will not be described in detail.

Suitable contact pressure between endless torque-transmitting means 26 and pulleys SS1 and SS2 is important to ensure prolonged reliable operation of the belt-driven conical-pulley transmission. As explained, that contact pressure must be such that the belt-driven transmission does not slip, i.e., that its slippage is not unacceptably great, and on the other hand that it is not pressed with unnecessary force.

To ensure that, a slip value must be determined that corresponds to the slippage or the torque transmitting capability or reliability of the transmission, and on the basis of which the contact pressure forces can be controlled by means of control unit 34 in such a way that the transmission operates with a predetermined, optimal slippage, depending on the operating conditions.

To determine the slip value, input shaft 6 is provided with a rotational speed sensor or rotation counter 38, and output shaft 16 is provided with a rotational speed sensor 40. The rotational speed sensors are connected to an analysis and determining unit 42, which communicates with control unit 34 via bus 36. Stored in control unit 34 are programs with which hydraulic valve 30 can be operated, for example, so that the pressure in pressure chamber 24 of pulley SS2 on the output side is modulated in a predetermined way. The pressure at a given moment is detected with the help of a pressure sensor 44 that is connected to control unit 34, so that the instantaneous pressure is known in control unit 34 and (through bus connector 36) in analysis and determining unit 42.

If the pressure in pressure chamber 24 of take-off side pulley SS2, which is designed with a larger effective cross section, is modulated at a frequency that does not trigger any adjustment of transmission ratio, i.e., which is higher than the frequency at which the transmission ratio is changed following a pressure change, by opposite changes to the spacing of the conical disks of each of the disk pairs, the influence of the pressure modulation on the transmission ratio or the ratio of rotational speeds between the two conical disk pairs is caused exclusively by changes in the slippage between endless torque-transmitting means 26 and the conical disk pairs. Typically, transmission ratio adjustments are realizable up to about 10 to 15 Hz, so that a favorable modulation frequency is over 20 Hz, for example 33 Hz.

Figure 2:
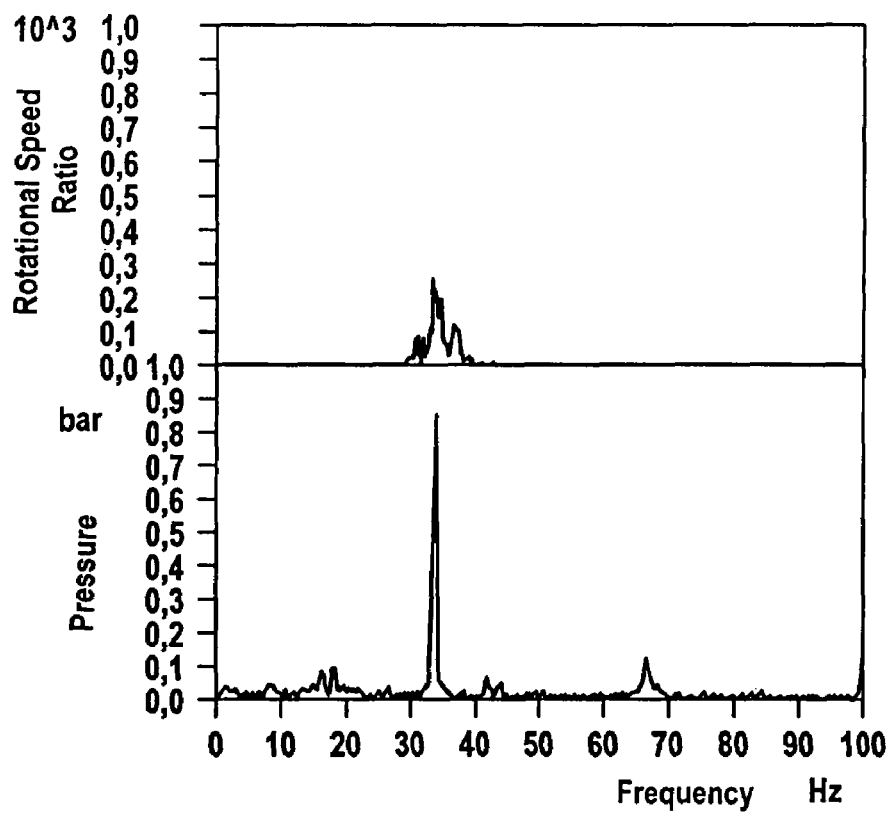
FIG. 2: graphs that show a pressure modulation and the reaction of the difference in rotational speed to the pressure modulation.

The lower graph in FIG. 2 shows a pressure modulation with an amplitude of about 0.1 bar at a frequency of about 33 Hz. The upper graph shows how the ratio of rotational speeds (the ratio between the speeds measured by sensors 38 and 40) follows that pressure modulation. When the torque-transmitting capability of the transmission is great, i.e., in transmissions that operate with little slippage, the ratio of rotational speeds reacts only slightly to a pressure modulation. The lower the reliability of torque transmission, the more strongly the ratio of rotational speeds reacts to the stimulus from the pressure modulation.

It has been found that the reaction of the difference in rotational speed depends both on the level of reliability of transmission and on the amplitude and frequency of the pressure modulation. For that reason, it is necessary to make the portion of useful signal in the slippage signal, i.e., that part which depends on the reliability of transmission, even more clearly visible. This is achieved through the described method with the standardized slippage signal.

Figure 3:
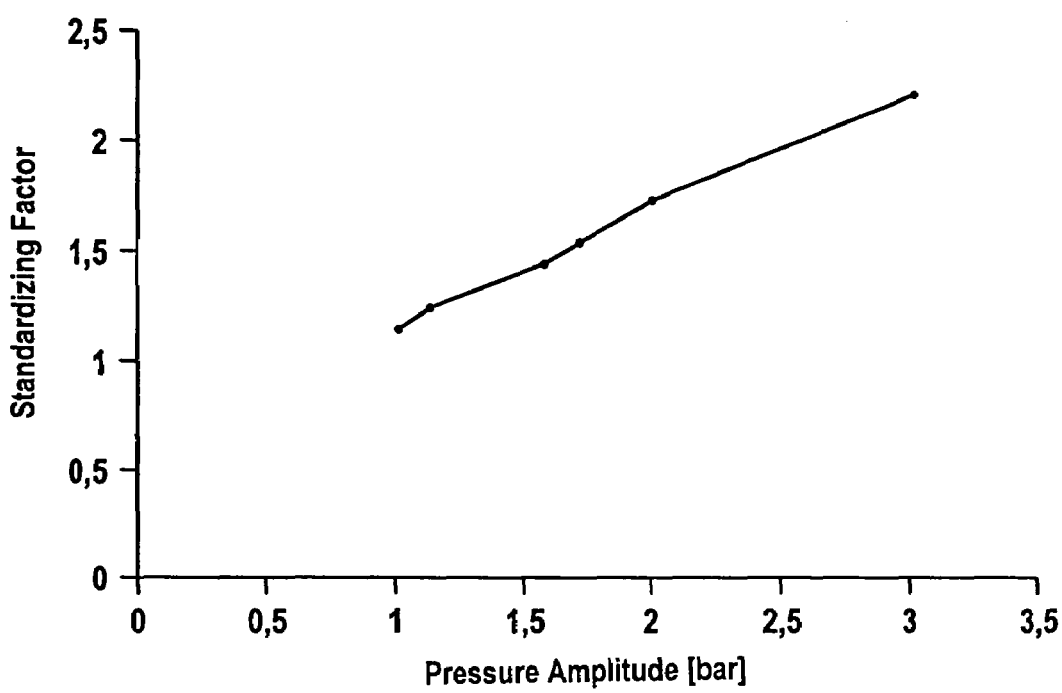
FIG. 3: a characteristic curve to explain the determination of a standardized slip value.

FIG. 3 shows a graph that indicates how the ratio of rotational speeds changes depending on the amplitude of the pressure modulation, while the excitation frequency and the reliability of transmission remain the same. At a pressure amplitude of 1 bar a certain change of the difference in rotational speeds is achieved, which is taken as the standard in FIG. 3. As the pressure amplitude increases, the measured change in the difference in rotational speeds or the determined slip value increases, and at a pressure amplitude of about 2.5 for example it is about twice the value measured at the pressure amplitude of 1. Based on the graph in FIG. 3, a slip value measured at a particular pressure amplitude can thus be standardized to the slip value measured for example at a pressure amplitude of 1 bar, so that based on the characteristic curve a standardized slip value can be determined which is independent of the particular known amplitude of the modulated contact pressure force. In a similar way, it is possible to measure a frequency-dependent curve for a constant pressure amplitude, so that a frequency standardization of a measured slip value is also possible. Those standardizations can be dependent on additional operating parameters of the transmission, such as, for example, the transmission ratio and the level of contact pressure reliability. Characteristic curves in the nature of FIG. 3 are determined for a particular transmission, and are stored as characteristic curves or characteristic fields (pressure and frequency dependency of the standardizing factor), for example in the analysis and determining unit, and are used for determining the actual slippage condition of the particular operating point.

Determination of the slip value by the lock-in principle will be explained below by way of example.

Figure 4:
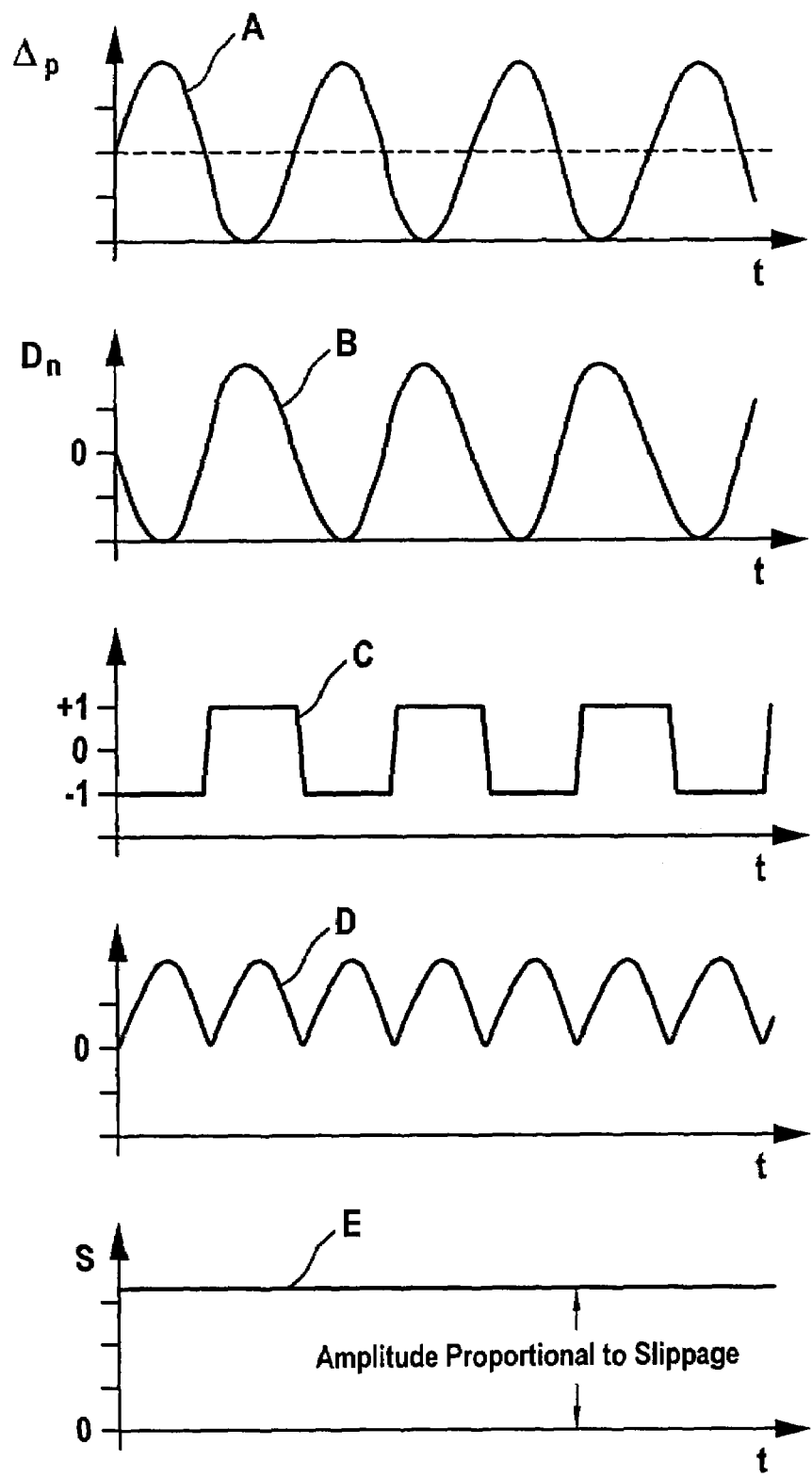
FIG. 4: the determination of a slip value in accordance with the lock-in principle.

In FIG. 4, plot A indicates the modulation $\Delta p$ of the contact pressure force over time.

Plot B shows the change in rotational speed difference $\Delta n=(n1-ivar_{TP}*n2)$ of the rotational speeds of pulleys SS1 and SS2 triggered by the pressure modulation. The low-pass filtered transmission ratio can be obtained, for example, by appropriate filtering of the rotational speed ratio n1/n2.

Plot C shows the algebraic sign of the variation of the modulated pressure around its mean; its value is −1 when the pressure is above the mean and +1 if the pressure is below the mean.

Plot D shows the product of plots B and C, and is a measure of the absolute value of the respective change in the difference in rotational speeds.

Plot E indicates the mean value of plot D, and is a measure of the slippage S.

It goes without saying that other methods can also be used to determine the slip value S, for example an FFT method. It is also advantageous to employ band pass filters, so that evaluations are made only within relevant frequency ranges, or so that a mean value (transition from plot D to plot E) can be obtained in a simple way and while suppressing noise or other influences.

The slip value determined in each case in accordance with the lock-in principle can be converted to a standardized slip value by using the characteristic curve, for example in accordance with FIG. 3, and reliably indicates as the standardized slip value the particular torque transmission reliability or the slippage of the belt-driven transmission, so that the pressures can be used for optimal setting of the particular slippage or torque transmission reliability of the transmission.

The invention can be modified in diverse ways. For example, two corresponding pressure chambers of the pulleys in accordance with FIG. 1 can be operated simultaneously under pressure modulation. However it is advantageous, as explained, to modulate the pressure only in the larger pressure chamber of the output side pulley. The modulating of pressure to determine the particular torque transmission reliability can be carried out while a motor vehicle is being driven, whenever a slight change in the slippage is not critical. Determining the slip value does not involve any perceptible sacrifice of comfort by the vehicle occupants, since it is not connected with any change in speed that is perceptible to the vehicle occupants. Instead of the change in the difference in rotational speeds, the change in the difference of the rotational speed ratio of the disk pairs as a reaction to the pressure modulation can be evaluated.

What is claimed is:

1. A method for determining a slip value that describes the torque transmission reliability between two conical disk pairs of a belt-driven conical-pulley transmission that are frictionally engaged by an endless torque-transmitting means, said method comprising the steps of: modulating a contact pressure force between at least one conical disk pair and the endless torque-transmitting means; and determining a slip value from a reaction to a difference in rotational speeds of the conical disk pairs on the modulation of the contact pressure force, wherein the pressure modulation takes place at a frequency higher than a transmission ratio adjustment frequency of the transmission and at a predetermined pressure modulation amplitude.

2. A method for determining a slip value that describes the torque transmission reliability between two conical disk pairs of a belt-driven conical-pulley transmission that are frictionally engaged through an endless torque-transmitting means, said method comprising the steps of: modulating a contact pressure force between at least one conical disk pair and the endless torque-transmitting means; and determining a slip value from a reaction to a difference in rotational speeds of the conical disk pairs on the modulation of the contact pressure force, wherein the pressure modulation takes place at a frequency higher than a transmission ratio adjustment frequency of the transmission, the amplitude of the pressure modulation is detected, and the slip value is determined as a function of the pressure modulation amplitude.

3. A method for determining a slip value that describes the torque transmission reliability between two conical disk pairs of a belt-driven conical-pulley transmission that are frictionally engaged by an endless torque-transmitting means, said method comprising the steps of: modulating a contact pressure force between at least one conical disk pair and the endless torque-transmitting means; and determining a slip value from a reaction to a difference in rotational speeds of the conical disk pairs on the modulation of the contact pressure force, wherein the pressure modulation takes place at a frequency higher than a transmission ratio adjustment frequency of the transmission, the frequency of the pressure modulation is detected, and the slip value is determined as a function of the pressure modulation frequency.

4. A method in accordance with claim 1, wherein the contact pressure force acting on an output side conical disk pair is modulated.

5. A method in accordance with claim 1, wherein the transmission includes a plurality of pressure chambers acting on a conical disk pair, and including the step of modulating the contact pressure force acting in a pressure chamber having a largest effective cross section.

6. A method in accordance with claim 1, including the step of determining the slip value by use of a lock-in principle.

7. A method in accordance with claim 1, including the step of determining the slip value using at least one band pass filtering.

8. A method in accordance with claim 1, including the step of determining a standardized slip value from the determined slip value from a parameter of a pressure modulation characteristic curve that is a function of the slip value.

9. Apparatus for determining a slip value that describes the torque transmission reliability between two conical disk pairs of a belt-driven conical-pulley transmission that are frictionally engaged by an endless torque-transmitting means, said apparatus comprising:

means for producing a modulation of a contact pressure force exerted by at least one conical disk pair on the endless torque-transmitting means; means for determining rotational speeds of the conical disk pairs;

means for determining at least one parameter of the modulation of pressing force; and an analysis and determining unit for ascertaining a ratio of the rotational speeds of the conical disk pairs and for determining a slip value, which analysis and determining operates according to the method claimed in claim 1.

* * * * *